United States Patent
Chen et al.

(10) Patent No.: US 11,032,732 B2
(45) Date of Patent: *Jun. 8, 2021

(54) TRANSPORT BLOCK SIZE DETERMINATION

(71) Applicant: QUALCOMM Incorporated, San Diego, CA (US)

(72) Inventors: Wanshi Chen, San Diego, CA (US); Hao Xu, Beijing (CN); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/750,577

(22) Filed: Jan. 23, 2020

(65) Prior Publication Data

US 2020/0169910 A1 May 28, 2020

Related U.S. Application Data

(63) Continuation of application No. 14/887,292, filed on Oct. 19, 2015, now Pat. No. 10,575,205.

(Continued)

(51) Int. Cl.
*H04W 28/02* (2009.01)
*H04W 28/18* (2009.01)
(Continued)

(52) U.S. Cl.
CPC ......... *H04W 28/0215* (2013.01); *H04W 4/70* (2018.02); *H04W 28/18* (2013.01); *H04W 72/04* (2013.01)

(58) Field of Classification Search
None
See application file for complete search history.

(56) References Cited

U.S. PATENT DOCUMENTS 9,603,162 B2  3/2017  Wang
2013/0083753 A1  4/2013  Lee et al.
(Continued)

FOREIGN PATENT DOCUMENTS

CN  103518398 A  1/2014
JP  2013085152 A  5/2013
(Continued)

OTHER PUBLICATIONS

European Search Report—EP19196935—Search Authority—The Hague—dated Oct. 1, 2019.
(Continued)

*Primary Examiner* — Adnan Baig
(74) *Attorney, Agent, or Firm* — QUALCOMM Incorporated

(57) ABSTRACT

Aspects of the present disclosure provide techniques that may be applied in systems comprising machine type communication (MTC) user equipments (UEs). An exemplary method performed by a base station comprises using a first transport block size (TBS) table to communicate with a first type of user equipment (UE), using a second TBS table to communicate with a second type of UE, wherein the first type of UE supports a reduced peak data rate relative to the second type of UE, signaling information to the first type of UE for use in determining a TBS from the first TBS table, and communicating with the first type of UE, with one or more transmissions having a payload with a number of bits determined based on a TBS value from the first TBS table selected based, at least in part, on the signaled information.

60 Claims, 11 Drawing Sheets

Related U.S. Application Data

(60) Provisional application No. 62/066,300, filed on Oct. 20, 2014.

(51) Int. Cl.
*H04W 4/70* (2018.01)
*H04W 72/04* (2009.01)

(56) References Cited

U.S. PATENT DOCUMENTS

| | | | |
|---|---|---|---|
| 2013/0308504 A1 | 11/2013 | Nimbalker et al. | |
| 2014/0301356 A1* | 10/2014 | Wang | H04L 5/0046 370/330 |
| 2014/0307690 A1 | 10/2014 | Kim et al. | |
| 2015/0195069 A1* | 7/2015 | Yi | H04W 76/27 370/329 |
| 2015/0237644 A1* | 8/2015 | Golitschek Edler von Elbwart | H04W 72/042 370/329 |
| 2016/0112898 A1 | 4/2016 | Chen et al. | |
| 2016/0255646 A1* | 9/2016 | Bergman | H04W 72/1257 370/329 |
| 2017/0134879 A1* | 5/2017 | Wong | H04W 24/10 |

FOREIGN PATENT DOCUMENTS

| | | |
|---|---|---|
| JP | 2015509673 A | 3/2015 |
| WO | 2013119158 A1 | 8/2013 |

OTHER PUBLICATIONS

Huawei, et al., "[Draft] LS to RAN2 on 36.306 for Low Cost MTC UE", 3GPP TSG RAN WG1 Meeting #77, R1-141945, May 2014, 2 Pages, https://www.3gpp.org/ftp/tsg_ran/WG1_RL1/TSGR1_77/Docs/R1-141945.zip.

International Search Report and Written Opinion—PCT/US2015/056353—ISA/EPO—dated Jan. 18, 2016.

Motorola, et al., "Remaining Details of MCS/TBS Signalling", 3GPP TSG-RAN1#53, R1-082211, May 2008, 4 Pages, https://www.3gpp.org/flp/tsg_ran/WG1_RL1/TSGR1_53/Docs/R1-082211.zip.

Samsung: "UE Category/Type for Low Cost and Enhanced Coverage MTC UE", 3GPP TSG RAN WG1 Meeting #74, R1-133099, Aug. 2013, 2 Pages, URL: https://www.3gpp.org/ftpftsg_ran/WG1_RL1/TSGR1_74/Docs/R1-133099.zip.

Ericsson: "eMBMS Support for Low Complexity UEs", 3GPP TSG-RAN WG2 #86, Tdoc R2-142565, Seoul, South Korea, May 19-24, 2014, pp. 1-4.

Ericsson: "UE Category Parameters for Low Complexity UE", 3GPP TSG-RAN WG1 Meeting #77,R1-142370, Seoul, Korea, May 19-23, 2014, 4 Pages.

* cited by examiner

| I_TBS | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| TBS | 40 | 56 | 72 | 120 | 136 | 144 | 176 | 208 | 224 | 256 | 280 | 296 | 328 | 336 | 392 | 488 |
| I_TBS | 16 | 17 | 18 | 19 | 20 | 21 | 22 | 23 | 24 | 25 | 26 | 27 | 28 | 29 | 30 | 31 |
| TBS | 552 | 600 | 632 | 696 | 776 | 840 | 904 | 1000 | 1064 | 1128 | 1224 | 1288 | 1384 | 1480 | 1608 | 1736 |

*FIG. 8*

| I_TBS | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| TBS | 40 | 56 | 72 | 120 | 136 | 144 | 176 | 208 | 224 | 256 | 280 | 296 | 328 | 336 | 392 | 488 |
| I_TBS | 16 | 17 | 18 | 19 | 20 | 21 | 22 | 23 | | | | | | | | |
| TBS | 552 | 600 | 632 | 696 | 776 | 840 | 904 | 1000 | | | | | | | | |

New TBS table for eMTC broadcast (based on the 1C table with truncation) – 5-bit MCS

*FIG. 9A*

| I_TBS | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| TBS | 40 | 56 | 72 | 120 | 136 | 144 | 176 | 208 | 224 | 256 | 280 | 296 | 328 | 336 | 392 | 488 |
| I_TBS | 16 | 17 | 18 | 19 | 20 | 21 | 22 | 23 | 24 | 25 | 26 | 27 | 28 | 29 | 30 | 31 |
| TBS | 552 | 600 | 632 | 696 | 776 | 840 | 904 | 1000 | 16 | 24 | 32 | 104 | 376 | 440 | 872 | 936 |

New TBS table for eMTC unicast (based on the 1C table with modification) – 5-bit MCS

*FIG. 9B*

| I_TBS | 0 | 1 | 2 | 3 | 4 | 5 | 6 | 7 | 8 | 9 | 10 | 11 |
|---|---|---|---|---|---|---|---|---|---|---|---|---|
| TBS | 40 | 56 | 72 | 120 | 136 | 144 | 176 | 208 | 224 | 256 | 280 | 296 |

New TBS table for eMTC broadcast (based on the 1C table with truncation) – 4-bit MCS

FIG. 10A

| I_TBS | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| TBS | 40 | 56 | 72 | 120 | 136 | 144 | 176 | 208 | 224 | 256 | 280 | 296 | 16 | 24 | 32 | 88 |

New TBS table for eMTC unicast (based on the 1C table with modification) – 4-bit MCS

FIG. 10B

| I_TBS | 0 | 1 | 2 | 3 | 4 | 5 | 6 | 7 | 8 | 9 | 10 | 11 |
|---|---|---|---|---|---|---|---|---|---|---|---|---|
| TBS | 40 | 56 | 72 | 120 | 136 | 144 | 176 | 208 | 224 | 256 | 280 | 296 |

New TBS table for eMTC broadcast (based on the 1C table with truncation) – 4-bit MCS

*FIG. 11A*

| I_TBS | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| TBS | 40 | 56 | 72 | 120 | 136 | 144 | 176 | 208 | 224 | 256 | 280 | 296 | 328 | 336 | 392 | 488 |
| I_TBS | 16 | 17 | 18 | 19 | 20 | 21 | 22 | 23 | 24 | 25 | 26 | 27 | 28 | 29 | 30 | 31 |
| TBS | 552 | 600 | 632 | 696 | 776 | 840 | 904 | 1000 | 16 | 24 | 32 | 104 | 376 | 440 | 872 | 936 |

New TBS table for eMTC unicast (based on the 1C table with modification) – 5-bit MCS

*FIG. 11B*

TRANSPORT BLOCK SIZE DETERMINATION

CLAIM OF PRIORITY UNDER 35 U.S.C. § 119

This application is a continuation of U.S. patent application Ser. No. 14/887,292 filed Oct. 19, 2015, issued as U.S. Pat. No. 10,575,205 on Feb. 25, 2020, which claims benefit of U.S. Provisional Patent Application Ser. No. 62/066,300, filed Oct. 20, 2014, and entitled "TRANSPORT BLOCK SIZE DETERMINATION," which are herein incorporated by reference in their entirety.

BACKGROUND

I. Field

Certain aspects of the present disclosure generally relate to wireless communications and, more particularly, transport block size (TBS) determination.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

To enhance coverage of certain devices, such as machine type communication(s) (MTC) devices, "bundling" may be utilized in which certain transmissions are sent as a bundle of transmissions over multiple transmission time intervals (TTIs), for example, with the same information transmitted over multiple subframes.

SUMMARY

Certain aspects of the present disclosure provide a method, performed by a base station, for determining a transport block size (TBS) for communications involving machine-type-communication user equipments. The method generally includes using a first transport block size (TBS) table to communicate with a first type of user equipment (UE), using a second TBS table to communicate with a second type of UE, wherein the first type of UE supports a reduced peak data rate relative to the second type of UE, signaling information to the first type of UE for use in determining a TBS from the first TBS table, and communicating with the first type of UE with one or more transmissions having a payload with a number of bits determined based on a TBS value from the first TBS table selected based, at least in part, on the signaled information.

Certain aspects of the present disclosure provide an apparatus for wireless communications by a base station. The apparatus generally includes means for using a first transport block size (TBS) table to communicate with a first type of user equipment (UE), means for using a second TBS table to communicate with a second type of UE, wherein the first type of UE supports a reduced peak data rate relative to the second type of UE, means for signaling information to the first type of UE for use in determining a TBS from the first TBS table, and means for communicating with the first type of UE with one or more transmissions having a payload with a number of bits determined based on a TBS value from the first TBS table selected based, at least in part, on the signaled information.

Certain aspects of the present disclosure provide an apparatus for wireless communications by a base station. The apparatus generally includes at least one processor configured to use a first transport block size (TBS) table to communicate with a first type of user equipment (UE), use a second TBS table to communicate with a second type of UE, wherein the first type of UE supports a reduced peak data rate relative to the second type of UE, signal information to the first type of UE for use in determining a TBS from the first TBS table, and communicate with the first type of UE with one or more transmissions having a payload with a number of bits determined based on a TBS value from the first TBS table selected based, at least in part, on the signaled information; and a memory coupled with the at least one processor.

Certain aspects of the present disclosure provide a computer program product for wireless communications by a base station (BS) comprising a computer readable medium having instructions stored thereon. The instructions, when executed by at least one processor, causes the at least one processor to use a first transport block size (TBS) table to communicate with a first type of user equipment (UE), use a second TBS table to communicate with a second type of UE, wherein the first type of UE supports a reduced peak data rate relative to the second type of UE, signal information to the first type of UE for use in determining a TBS from the first TBS table, and communicate with the first type of UE with one or more transmissions having a payload with a number of bits determined based on a TBS value from the first TBS table selected based, at least in part, on the signaled information.

Certain aspects of the present disclosure provide a method, performed by a user equipment, for determining a TBS for communications involving machine-type-communication user equipments. The method generally includes using a first transport block size (TBS) table to communicate with a base station (BS), wherein the first TBS table has a reduced maximum TBS value relative to a second TBS table used by the BS to communicate with a second type of UE and wherein the first type of UE supports a reduced peak data rate relative to the second type of UE, receiving information from the BS for use in determining a TBS from the second TBS table, and communicating with the BS, with one or more transmissions having a payload with a number of bits determined based on a TBS value from the first TBS table selected based, at least in part, on information signaled from the BS.

Certain aspects of the present disclosure provide an apparatus for wireless communications by a user equipment.

The apparatus generally includes means for using a first transport block size (TBS) table to communicate with a base station (BS), wherein the first TBS table has a reduced maximum TBS value relative to a second TBS table used by the BS to communicate with a second type of UE and wherein the first type of UE supports a reduced peak data rate relative to the second type of UE, means for receiving information from the BS for use in determining a TBS from the second TBS table, and means for communicating with the BS, with one or more transmissions having a payload with a number of bits determined based on a TBS value from the first TBS table selected based, at least in part, on information signaled from the BS.

Certain aspects of the present disclosure provide an apparatus for wireless communications by a user equipment. The apparatus generally includes at least one processor configured to use a first transport block size (TBS) table to communicate with a base station (BS), wherein the first TBS table has a reduced maximum TBS value relative to a second TBS table used by the BS to communicate with a second type of UE and wherein the first type of UE supports a reduced peak data rate relative to the second type of UE, receive information from the BS for use in determining a TBS from the second TBS table, and communicate with the BS, with one or more transmissions having a payload with a number of bits determined based on a TBS value from the first TBS table selected based, at least in part, on information signaled from the BS; and a memory coupled with the at least one processor.

Certain aspects of the present disclosure provide a computer program product for wireless communications by a user equipment comprising a computer readable medium having instructions stored thereon. The instructions, when executed by at least one processor, causes the at least one processor to use a first transport block size (TBS) table to communicate with a base station (BS), wherein the first TBS table has a reduced maximum TBS value relative to a second TBS table used by the BS to communicate with a second type of UE and wherein the first type of UE supports a reduced peak data rate relative to the second type of UE, receive information from the BS for use in determining a TBS from the second TBS table, and communicate with the BS, with one or more transmissions having a payload with a number of bits determined based on a TBS value from the first TBS table selected based, at least in part, on information signaled from the BS.

Numerous other aspects are provided including methods, apparatus, systems, computer program products, and processing systems.

BRIEF DESCRIPTION OF THE DRAWINGS

FIG. 8 illustrates a exemplary TBS table for scheduled broadcast traffic, in accordance with certain aspects of the present disclosure.

FIGS. 9A and 9B illustrate exemplary TBS tables for eMTC broadcast and unicast, in accordance with certain aspects of the present disclosure.

FIGS. 10A and 10B illustrate exemplary TBS tables for eMTC broadcast and unicast, in accordance with certain aspects of the present disclosure.

FIGS. 11A and 11B illustrate exemplary TBS tables for eMTC broadcast and unicast, in accordance with certain aspects of the present disclosure.

DETAILED DESCRIPTION

Figure 1:
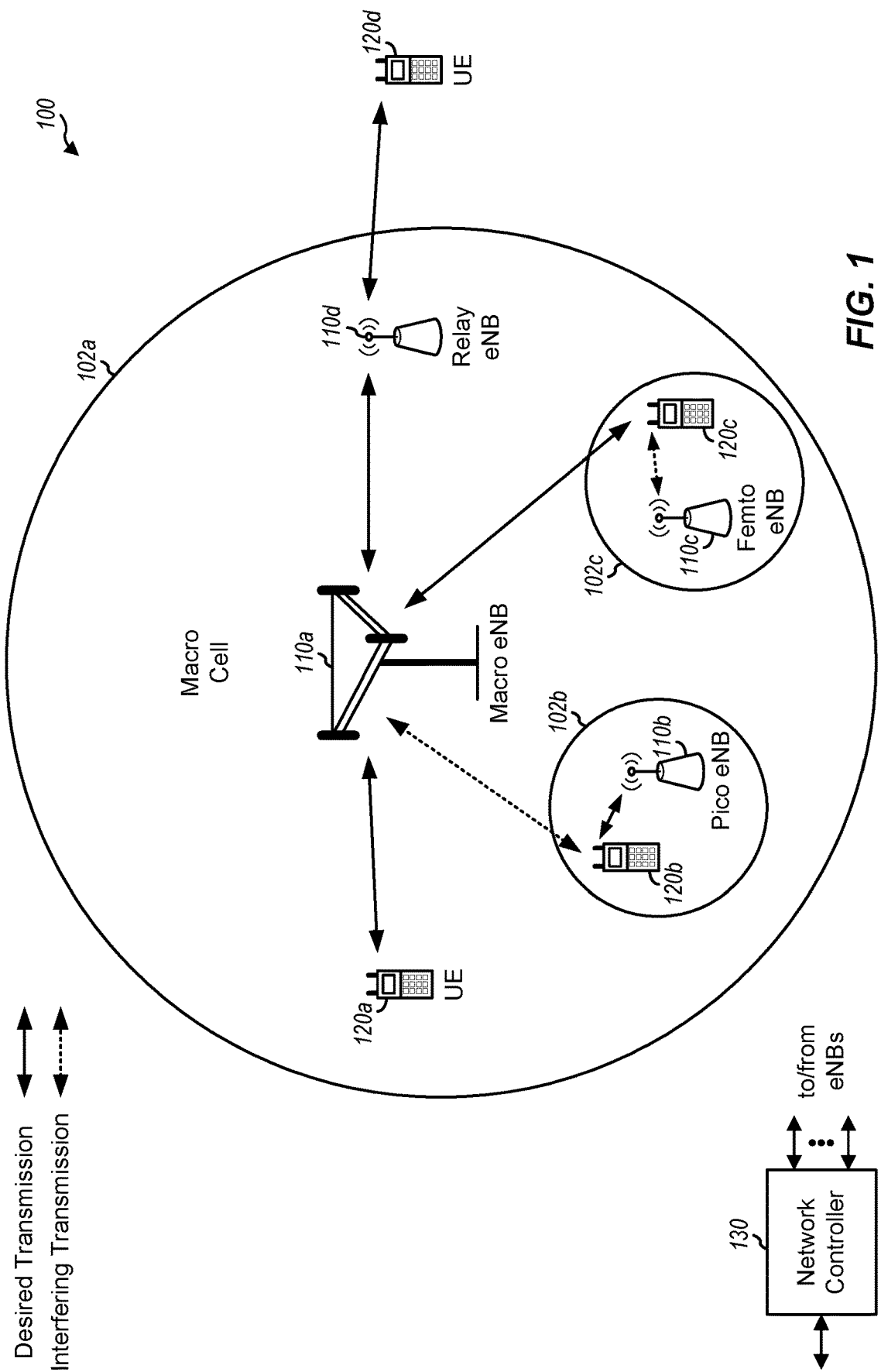
FIG. 1 is a block diagram conceptually illustrating an example of a wireless communication network, in accordance with certain aspects of the present disclosure.

Aspects of the present disclosure provide techniques that may help enable efficient communication between a base station and machine type communication (MTC)-based user equipments (UEs). For example, the techniques may help a UE that supports a reduced peak data rate (e.g., an MTC UE) to determine a transport block size (TBS) for use in communication between the UE and its serving base station (BS).

According to certain aspects, a TBS table with a reduced number of entries (relative to a TBS table for an existing or "legacy" UE type) may be provided. In some cases, a TBS table may have a same number of entries as a legacy TBS table, but with a reduced maximum TBS. In such a case, the TBS values in the table may not be monotonically increasing.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

A wireless communication network may include a number of base stations that can support communication for a number of wireless devices. Wireless devices may include user equipments (UEs). Some examples of UEs may include cellular phones, smart phones, personal digital assistants (PDAs), wireless modems, handheld devices, tablets, laptop computers, netbooks, smartbooks, ultrabooks, wearables (e.g., smart watch, smart bracelet, smart glasses, smart ring, smart clothing), etc. Some UEs may be considered machine-type communication (MTC) UEs, which may include remote devices, such as drones, robots, sensors, meters, location tags, etc., that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

FIG. 1 illustrates an example wireless communication network 100, in which aspects of the present disclosure may be practiced. For example, techniques presented herein may be used to help UEs shown in FIG. 1 determine a transport block size (TBS) to use when communicating with their serving base station (BS).

The network 100 may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, etc. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

Figure 2:
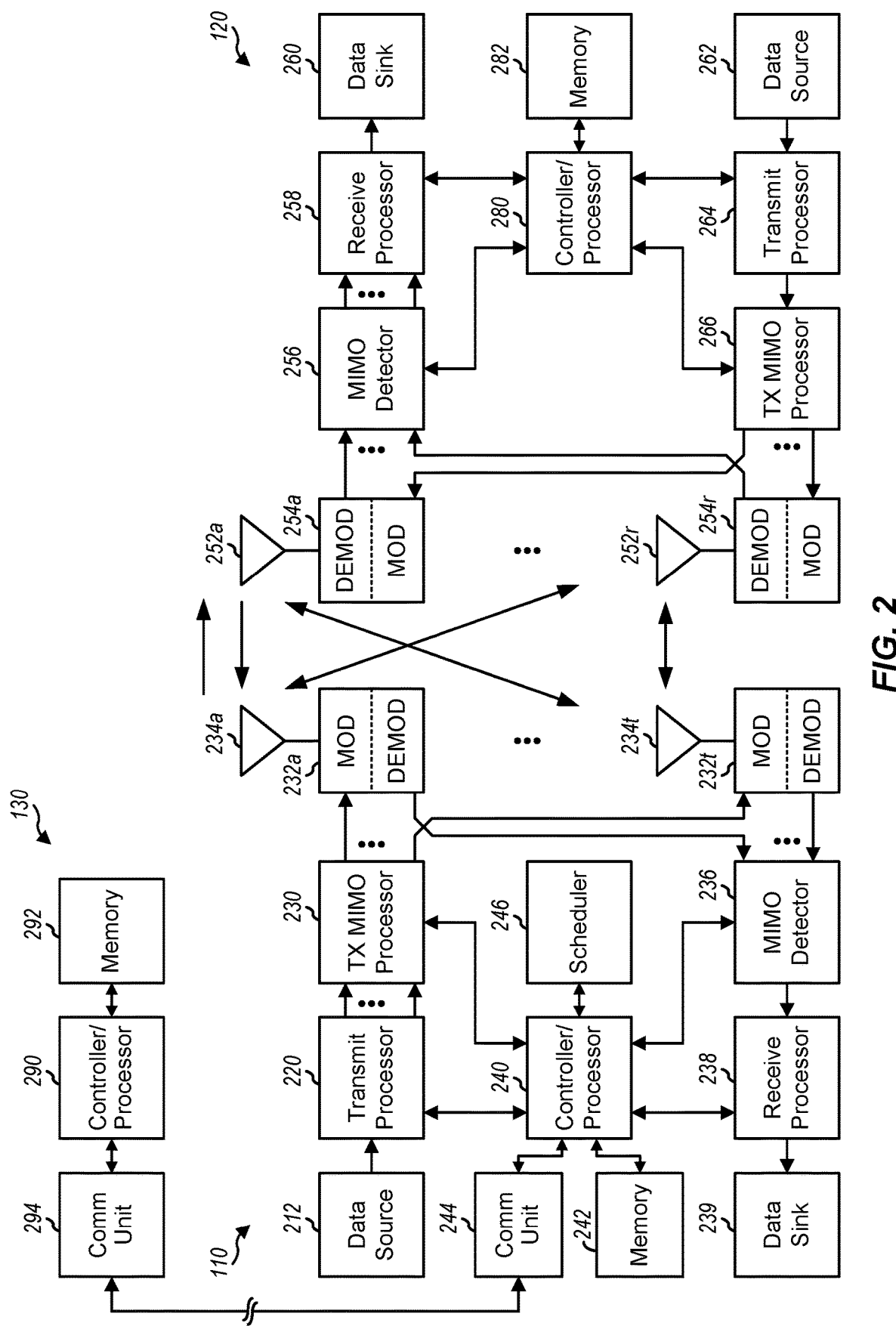
FIG. 2 shows a block diagram conceptually illustrating an example of a base station in communication with a user equipment (UE) in a wireless communications network, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively, to perform techniques presented herein for determining a transport block size (TBS) to use for communications between a UE (e.g., an eMTC UE) and a base station (e.g., an eNodeB). For example, processor 240 and/or other processors and modules at base station 110 may perform direct operations 600 shown in FIG. 6. Similarly, processor 280 and/or other processors and modules at UE 120, may perform or direct operations 700 shown in FIG. 7. Memories 242 and 282 may store data and program codes for base station 110 and UE 120, respectively. A scheduler 246 may schedule UEs for data transmission on the downlink and/or uplink.

Figure 3:
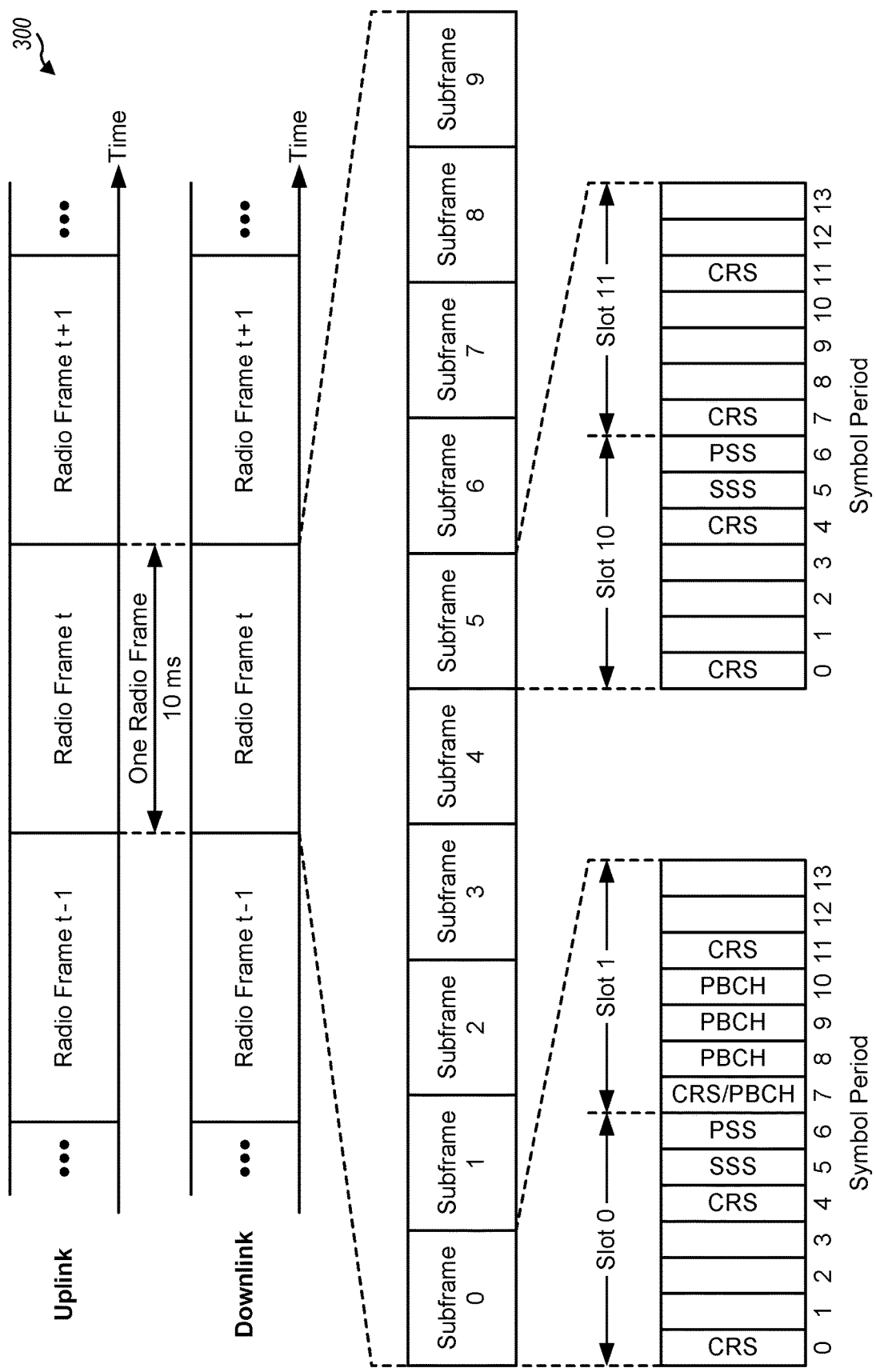
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Figure 4:
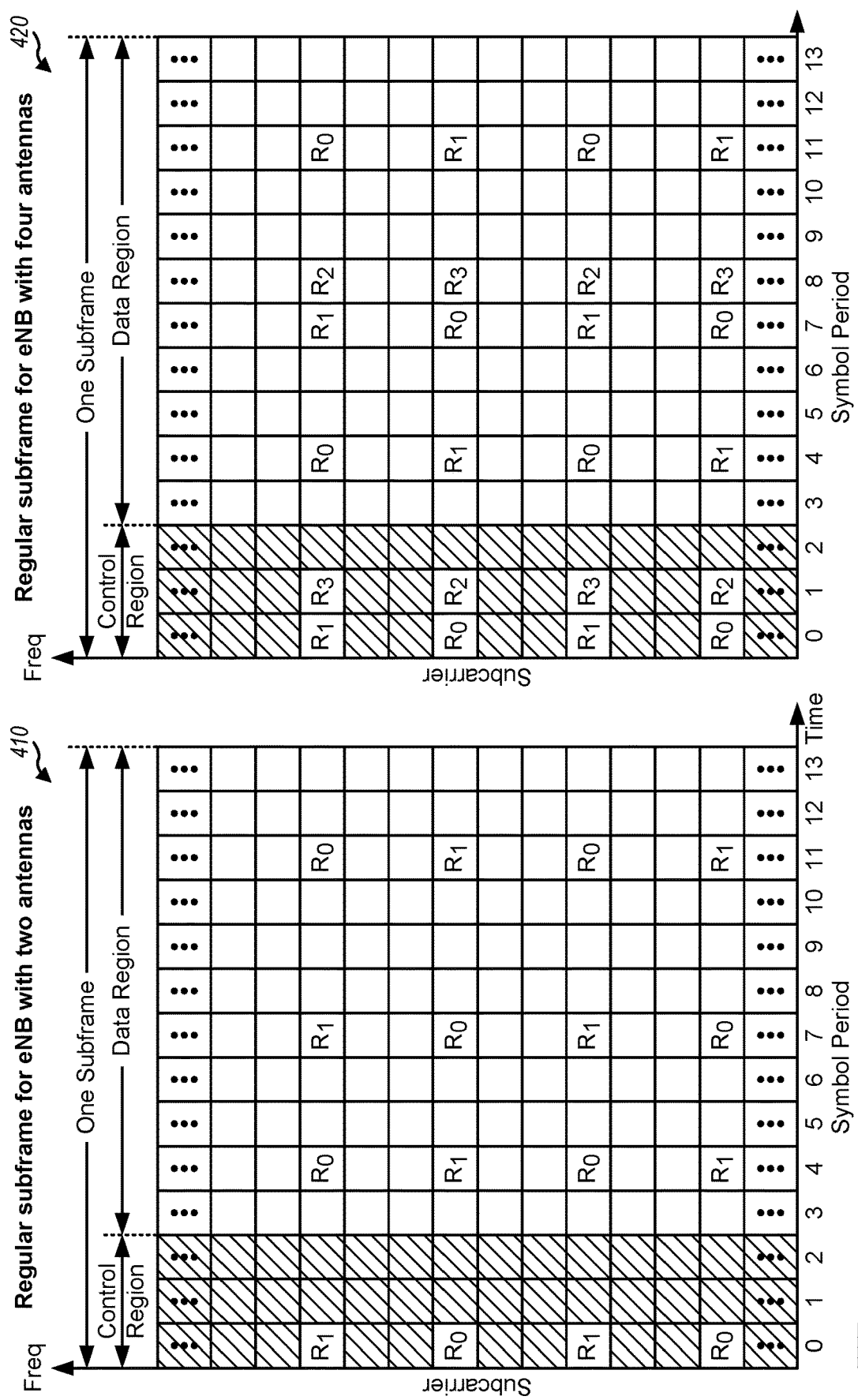
FIG. 4 is a block diagram conceptually illustrating two exemplary subframe formats with the normal cyclic prefix, in accordance with certain aspects of the present disclosure.

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

As noted above, techniques presented herein may be used to help UEs (e.g., MTC or eMTC UEs) determine a transport block size (TBS) to use when communicating with a BS (e.g., an eNodeB).

The focus of traditional LTE design (e.g., for legacy "non MTC" devices) is on the improvement of spectral efficiency, ubiquitous coverage, and enhanced quality of service (QoS) support. Current LTE system downlink (DL) and uplink (UL) link budgets are designed for coverage of high end devices, such as state-of-the-art smartphones and tablets, which may support a relatively large DL and UL link budget.

However, low cost, low rate devices need to be supported as well. For example, certain standards (e.g., LTE Release 12) have introduced a new type of UE (referred to as a category 0 UE) generally targeting machine type communications or low cost designs, generally referred to as machine type communication(s) (MTC) UEs. For MTC, various requirements may be relaxed as only a limited amount of information may need to be exchanged. For example, maximum bandwidth may be reduced (relative to legacy UEs), a single receive radio frequency (RF) chain may be used, peak rate may be reduced (e.g., a maximum of 100 bits for a transport block size), transmit power may be reduced, Rank 1 transmission may be used, and half duplex operation may be performed.

In some cases, if half-duplex operation is performed, MTC UEs may have a relaxed switching time to transition from transmitting to receiving (or receiving to transmitting). For example, the switching time may be relaxed from 20 μs for regular/legacy UEs to 1 ms for MTC UEs. Release 12 MTC UEs may still monitor downlink (DL) control channels in the same way as regular UEs, for example, monitoring for wideband control channels in the first few symbols (e.g., PDCCH) as well as narrowband control channels occupying a relatively narrowband, but spanning a length of a subframe (e.g., ePDCCH).

Certain standards (e.g., LTE Release 13) may introduce support for various additional MTC enhancements, referred to herein as enhanced MTC (or eMTC). For example, eMTC may provide MTC UEs with coverage enhancements up to 15 dB.

Figure 5:
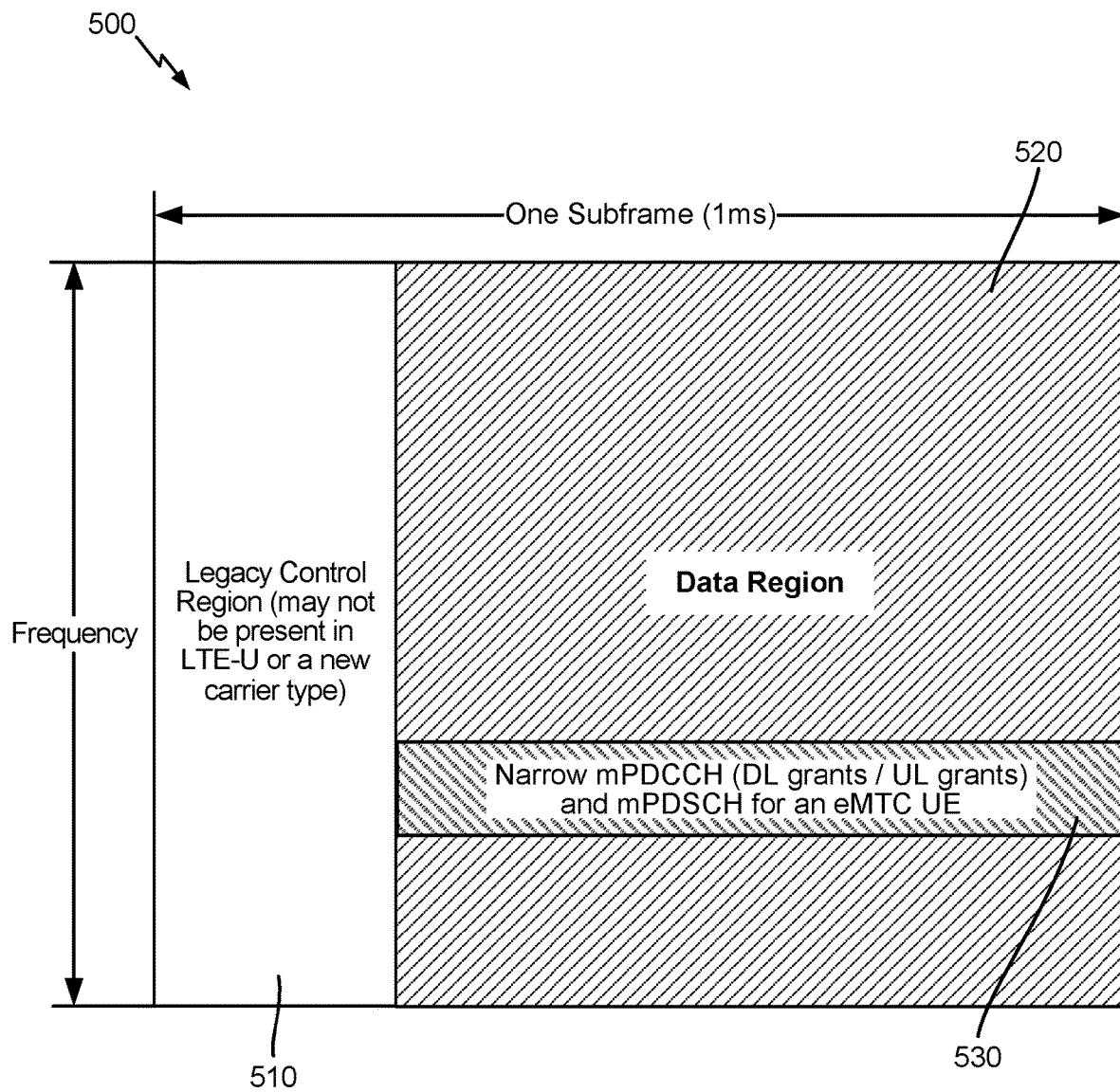
FIG. 5 illustrates an exemplary subframe configuration for eMTC, in accordance with certain aspects of the present disclosure.

As illustrated in the subframe structure 500 of FIG. 5, eMTC UEs can support narrowband operation while operating in a wider system bandwidth (e.g., 1.4/3/5/10/15/20 MHz). In the example illustrated in FIG. 5, a conventional legacy control region 510 may span system bandwidth of a first few symbols, while a narrowband region 530 of the system bandwidth (spanning a narrow portion of a data region 520) may be reserved for an MTC physical downlink control channel (referred to herein as an mPDCCH) and for an MTC physical downlink shared channel (referred to herein as an mPDSCH). In some cases, an MTC UE monitoring the narrowband region may operate at 1.4 MHz or 6 resource blocks (RBs).

As noted above, eMTC UEs may be able to operate in a cell with a bandwidth larger than 6 RBs. Within this larger bandwidth, each eMTC UE may still operate (e.g., monitor/receive/transmit) while abiding by a 6-physical resource block (PRB) constraint. In some cases, different eMTC UEs may be served by different narrowband regions (e.g., with each spanning 6-PRB blocks).

In any case, a transport block size (TBS) for communicating within this narrowband region may not be fixed. Thus, a mechanism may be needed to assist a UE, communicating within this narrowband region, to determine a TBS.

In certain systems (e.g., LTE), a transport block size (TBS) is determined by using TBS tables that are defined for one layer or multiple transmission layers. The term layer generally refers to a number of spatial multiplexing layers, which generally depends on a rank indication (RI) feedback from the UE that identifies how many transmission layers the UE is able to discern.

Using a TBS table, a base station (e.g., an eNodeB 110) may signal information that the UE uses to look up a value from an entry in the TBS table. For example, for broadcast transmissions via a downlink control information (DCI) format 1A, one bit in the DCI may indicate a second or third column index of the TBS table, while a five-bit MCS in the DCI may indicate the row index. Additionally, for broadcast transmissions via DCI format 1C, a separate TBS table may be defined and a five-bit MCS in the DCI may indicate which entry, out of 32 entries, of the TBS table should be used.

According to certain aspects, for unicast transmissions, a number of assigned RBs may be mapped to a column index and a five-bit MCS may be mapped to a row index. In some cases, the column index may be equal to the number of assigned RBs. For some special cases (e.g., for special subframes in TDD), some scaling may be performed, for example:

column index=alpha*(# of assigned RBs)

where alpha is a scaling value less than 1. In some cases, the MCS to index row mapping may be many-to-one. That is, there may be cases when two or more MCS values map to the same row index. Additionally, in some cases, if the unicast transmission contains a transmission block with two or more layers, the TBS may further be determined based on the number of layers.

However, for MTC (or eMTC) UEs, certain issues may make it difficult to determine a TBS. For example, MTC UEs may be expected to support a limited set of transport block sizes. There may also be a limit on a maximum TBS size supported (e.g., 1000 bits, 500 bits, 300 bits, etc.). Additionally, MTC UEs may have certain coverage requirements, for example, as high at 15 dB. In some cases, TTI bundling operation may also be supported by MTC UEs, where a TB is transmitted in multiple transmission time intervals (e.g., over multiple subframes).

Due to these issues, the number of RBs associated with an MTC UE, especially under coverage enhancement (e.g., eMTC), may not serve as a good input parameter for TBS determination. Thus, aspects of the present disclosure provide solutions that may be utilized for determining a TBS for eMTC UEs and help address these issues.

Figure 6:
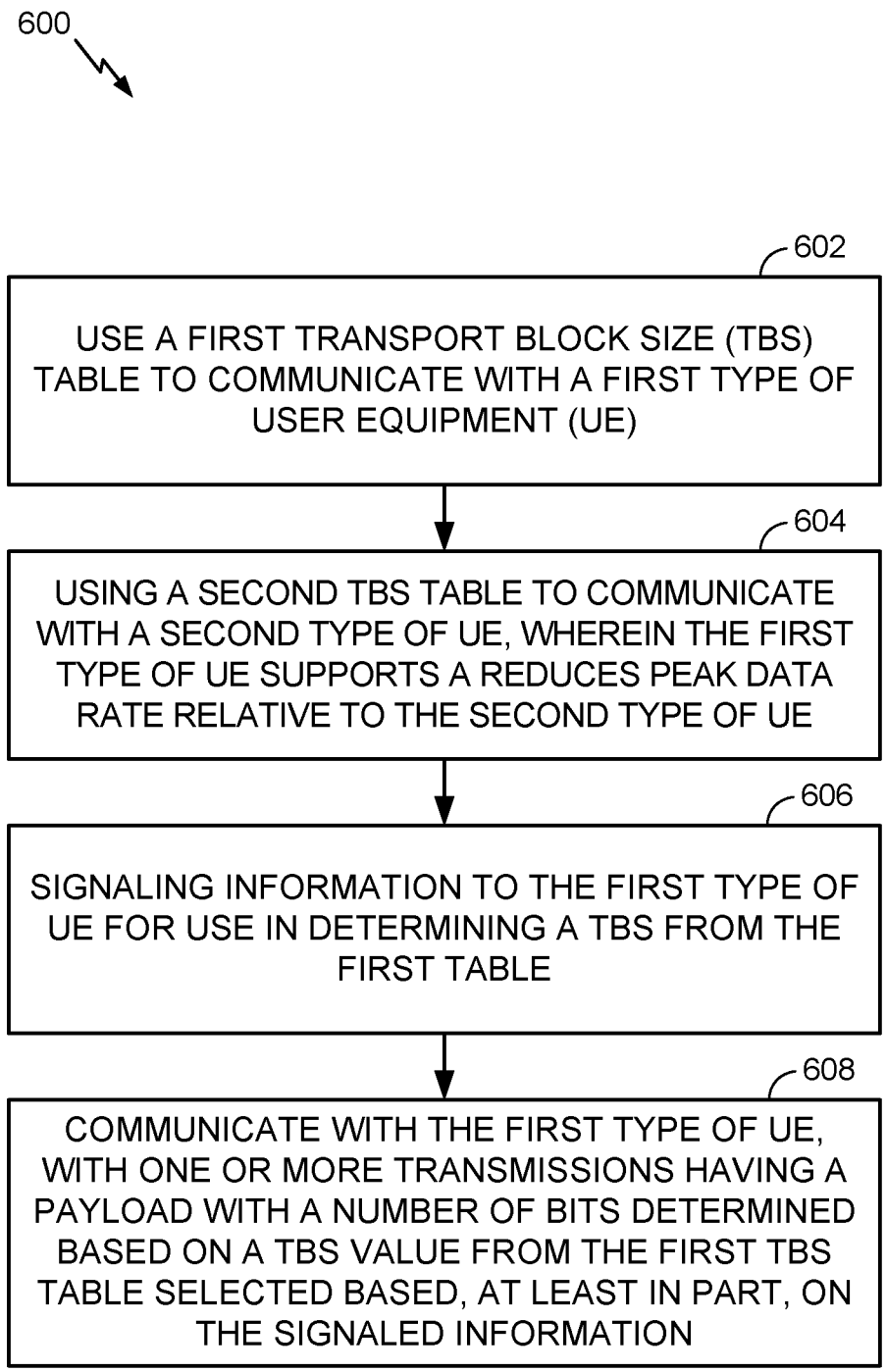
FIG. 6 illustrates example operations for wireless communications, by a base station (BS), in accordance with certain aspects of the present disclosure.

FIG. 6 illustrates example operations 600, performed by a base station (BS) (e.g., BSs 110), for determining a TBS for communications involving machine-type-communication user equipments (e.g., eMTC UEs).

Operations 600 begin, at 602 by using a first transport block size (TBS) table to communicate with a first type of user equipment (UE). At 604, the base station uses a second TBS table to communicate with a second type of UE, wherein the first type of UE supports a reduced peak data rate relative to the second type of UE. At 606, the base station signals information to the first type of UE for use in determining a TBS from the first TBS table. At 608, the base station communicates with the first type of UE with one or more transmissions having a payload with a number of bits determined based on a TBS value from the first TBS table selected based, at least in part, on the signaled information.

Figure 7:
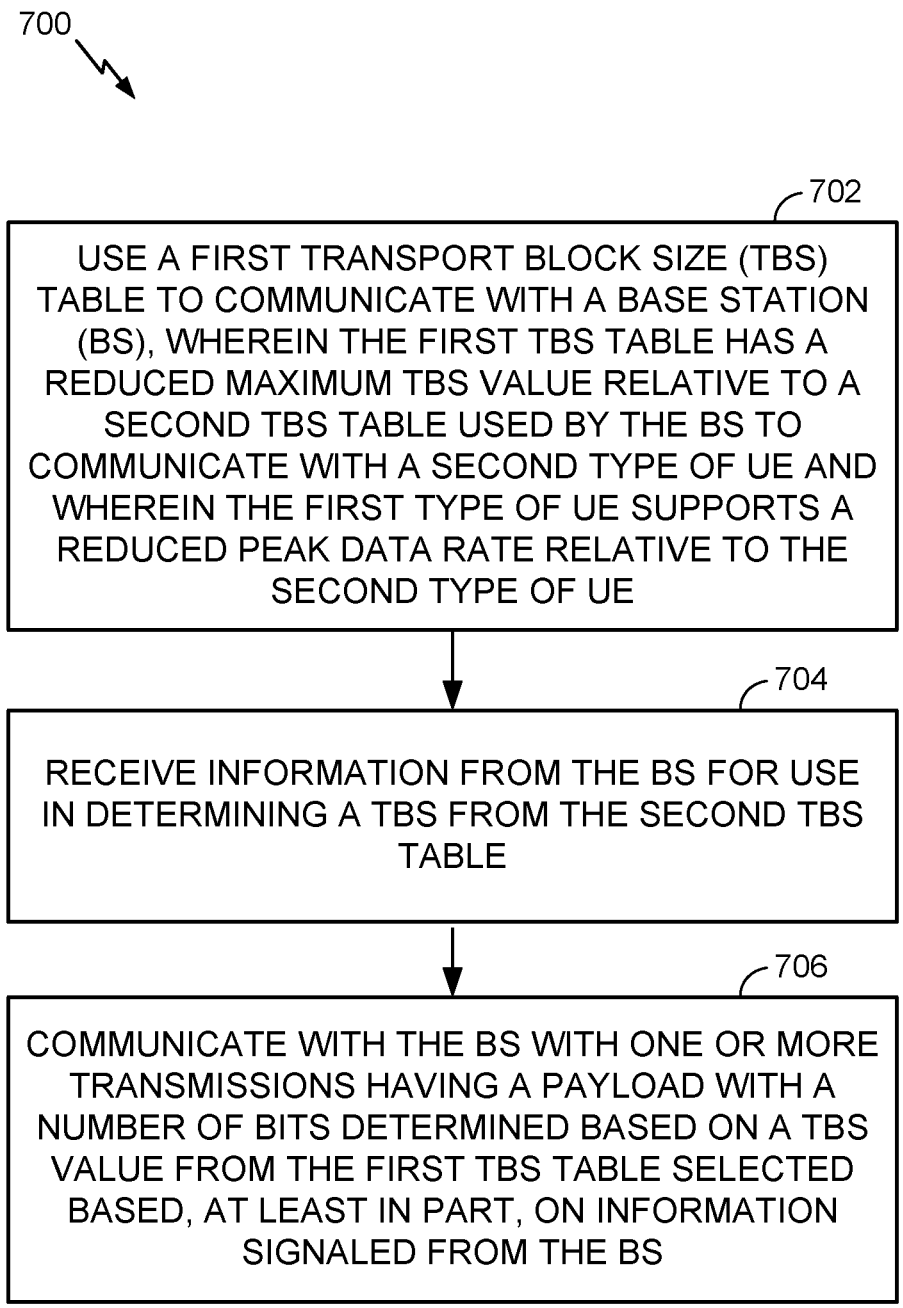
FIG. 7 illustrates example operations for wireless communications, by a user equipment (UE), in accordance with certain aspects of the present disclosure.

FIG. 7 illustrates example operations 700, performed by a UE (e.g., UE 120), for determining a TBS for communications involving machine-type-communication user equipments. Operations 700 may be considered complementary (UE-side) operations to (BS-side) operations 600 shown in FIG. 6.

Operations 700 begin, at 702, by using a first transport block size (TBS) table to communicate with a base station (BS), wherein the first TBS table has a reduced maximum TBS value relative to a second TBS table used by the BS to communicate with a second type of UE and wherein the first type of UE supports a reduced peak data rate relative to the second type of UE. At 704, the UE receives information from the BS for use in determining a TBS from the second TBS table. At 706, the UE communicates with the BS with one or more transmissions having a payload with a number of bits determined based on a TBS value from the first TBS table selected based, at least in part, on information signaled from the BS.

The particular content and size of the TBS tables, as well as the information used to select a TBS value from such tables, may vary according to different aspects.

For example, a TBS table of a limited amount of entries may be associated with eMTC unicast traffic. For example, a new table may be defined with limited entries specifically defined for eMTC UEs or that reuse some entries from existing TBS tables.

As an example, FIG. 8 shows an example of an existing TBS table for DCI format 1C for scheduled broadcast traffic. FIG. 9A, on the other hand, illustrates a new example TBS table for eMTC broadcast traffic having a maximum TBS of 1000 bits (e.g., less than the maximum TBS for existing TBS tables), which may be based on the 1C table illustrated in FIG. 8 with truncation (e.g., with entries above 1000 bits deleted). In other words, the TBS table illustrated in FIG. 9A may share a common set of entries as the TBS table illustrated in FIG. 8 but, in some cases, may truncate TBSs above 1000 bits. In some cases, the TBS tables illustrated in FIGS. 8 and 9A may (each) be subset of a larger TBS table.

Entries in the example table illustrated in FIG. 9A may be accessed via a five-bit index (e.g., a five-bit MCS).

As an alternative, rather than simply truncate entries for TBS values above 1000 bits, these entries may be re-used to provide different TBS granularity. For example, FIG. 9B illustrates an example of a new TBS table for eMTC unicast, which may be based on the 1C table illustrated in FIG. 8, but with different values (below 1000 bits) used in the final entries. For example, as illustrated in FIG. 8B, TBS indices 24-31 may be added with corresponding TBS values to provide different TBS granularity. Again, entries in the example table illustrated in FIG. 9B may be accessed via a five-bit index.

In some cases, however, a table may be designed with fewer entries allowing for a smaller bit index to be used. For example, FIGS. 10A and 10B illustrate exemplary new TBS tables for eMTC broadcast and unicast, assuming a max TBS of 300 bits. While the example table of FIG. 10A simply deletes entries above 300 bits, the example table of FIG. 10B allows for entries with greater granularity. In either case, by limiting entries to 16 or less, a four-bit index may be sufficient rather than the five-bit index needed for TBS tables with more than 16 entries.

FIG. 11A illustrates a exemplary new TBS table for eMTC broadcast, which may be based on the 1C table illustrated in FIG. 8 with truncation (relative to existing legacy TBS tables). As illustrated, the table illustrated in FIG. 11A may be for a four-bit MCS. FIG. 11B illustrates a exemplary new TBS table for eMTC unicast, which based on the 1C table illustrated in FIG. 8 with modified entries (relative to existing legacy TBS tables). For example, as illustrated, FIG. 11 includes TBS indices 24-31 and corresponding TBS values.

Note that the ordering of TBS values for entries of the TBS tables illustrated in FIGS. 9A-11B is not monotonically increasing. This may allow for greater reuse of certain portions (e.g., the first entries) of an existing table (e.g., format 1C table), and between broadcast/unicast.

From the limited (or modified) TBS tables described above, the determination of TBS for an eMTC for unicast transmissions may be based on an explicit index to the TBS table, while the number of RBs assigned to the MTC UES may not be used for TBS determination. That is, a base station may signal to the UE an explicit index to the TBS table, informing the UE of the TBS to use for transmissions between the UE and the BS. According to certain aspects, a payload of the transmissions (e.g., a number of bits) between the UE and BS may be determined based on a TBS value from the TBS table selected based, at least in part, on the signaled information (e.g., the explicitly signaled index).

In some cases, the base station may determine the explicit index based on a mapping to the TBS table. Additionally, in some cases, different mappings may be used for different operating modes of the UE. For example, there may be one mapping used for a receiving unicast transmissions mode while another mapping may be used for a receiving broadcast transmissions mode. Additionally, there may be different mappings for a downlink transmission mode versus uplink transmission mode. It should be noted that the operating modes noted above is not an exhaustive list of operating modes and that other operating modes not listed may exist.

According to certain aspects, TBS determination may be the same between broadcast and unicast for eMTC UEs. For example, the TBS determination for both broadcast and unicast may be based on the same TBS table and the same indexing approach. According to certain aspects, TBS determination for broadcast and unicast may be different (e.g., based on different TBS tables or indexing mechanism). Similarly, TBS determination may be the same, or different, for uplink and downlink.

Similarly, TBS determination may be the same, or different, for unicast/broadcast and Multimedia Broadcast Multicast Services (MBMS). According to certain aspects, TBS for MBMS may be determined differently, for example, using different indexing or TBS tables (e.g., MBMS TBS using a legacy TBS table).

According to certain aspects, TBS determination for eMTC UEs may be dependent on whether or not transmission time interval (TTI) bundling is enabled and/or may be dependent on a bundling length, where the bundling length indicates a number of subframes over which a payload is transmitted. For example, according to certain aspects, if TTI bundling is not enabled, a first TBS determination approach may be used, whereas if TTI bundling is not enabled, a second TBS determination approach may be used. According to certain aspects, the first TBS determination approach may involve determining TBS in the same fashion as for regular UEs, where the unicast TBS is determined based on MCS and the number of assigned RBs. The second TBS determination approach may involve determining the TBS based on explicit index to a TBS table of limited entries.

Additionally, as noted above, the TBS determination may be based on a bundling length. For example, if TTI bundling length is small, the first TBS determination approach above may be use, whereas if the TTI bundling length is large, the second TBS determination approach above may be used.

According to certain aspects, if two or more TBS determination approaches are associated with unicast traffic, there may be a default approach to use for fallback operation. For example, for fallback operation, a common search space scheduled DCI may always be associated with a fixed TBS determination scheme, while a UE-specific search space may be associated with a TBS scheme based on a configuration or implicit determination (e.g., based on TTI bundling).

The various mechanisms described above provide techniques for TBS value determination for UEs (e.g., eMTC UEs) that may support different maximum TBS values than existing (legacy UEs). Additionally, aspects of the present disclosure may also apply to other use cases. For example, if a regular UE needs to use TTI bundling for coverage enhancement (e.g., certain channels being repeated over a long time), a different mapping (e.g., one in accordance with the present disclosure) of TBS may also be used. Additionally, LTE Release 13 introduces a new narrowband internet of things (NB-IOT) work item, which may use one RB as a maximum bandwidth and long bundling. Thus, TBS may be determined in a similar fashion.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

For example, means for using, means for signaling, means for receiving, and/or means for communicating may include one or more processors, such as the transmit processor 220, the controller/processor 240, the receive processor 238, and/or antenna(s) 234 of the base station 110 illustrated in FIG. 2 or the transmit processor 264, the controller/processor 280, the receive processor 258, and/or antenna(s) 252 of the user equipment 120 illustrated in FIG. 2.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EPROM, EEPROM, flash memory, phase change memory, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a base station (BS), comprising:
communicating with a first type of user equipment (UE) based, at least in part, on a first transport block size (TBS) table;
communicating with a second type of UE based, at least in part, on a second TBS table, wherein the first type of UE supports a reduced peak data rate relative to the second type of UE, and wherein the first TBS table shares a common set of TBS values with the second TBS table;
sending information to the first type of UE for use in determining a TBS value based, at least in part, on the first TBS table; and
communicating with the first type of UE through one or more communications having a payload with a number of bits determined based on the determined TBS value.

2. The method of claim 1, wherein the first TBS table and second TBS table are each a subset of a larger TBS table.

3. The method of claim 1, wherein the sent information comprises an explicit index to the first TBS table.

4. The method of claim 3, wherein:
the explicit index is based on a mapping into the first TBS table; and
different mappings are used for different operating modes of the first type of UE.

5. The method of claim 4, wherein the different operating modes of the first type of UE comprise receiving downlink transmissions or transmitting uplink transmissions.

6. The method of claim 4, wherein the different operating modes of the first type of UE comprise receiving unicast transmissions or receiving broadcast transmissions.

7. The method of claim 1, wherein the TBS value from the first TBS table is determined, at least in part, based on a transmission time interval (TTI) bundling size indicating a number of TTIs over which a payload is transmitted.

8. The method of claim 1, wherein the sent information comprises a modulation and coding scheme (MCS) index.

9. The method of claim 1, wherein the first TBS table has a limited number of entries relative to the second TBS table.

10. The method of claim 9, wherein an index into the first TBS table comprises at least one less bit than an index into the second TBS table.

11. The method of claim 1, wherein the TBS value from the first TBS table is determined further based, at least in part, on resource assignment information.

12. The method of claim 1, wherein values in the first TBS table do not monotonically increase across all entries.

13. The method of claim 1, wherein the first TBS table is used to determine TBS values for at least one of:
both downlink and uplink transmissions;
both unicast and broadcast transmissions; or
Multimedia Broadcast Multicast Service (MBMS) transmissions.

14. The method of claim 1, wherein the one or more communications comprise one or more uplink or downlink communications.

15. A method for wireless communications by a user equipment (UE) of a first type, comprising:
communicating with a base station (BS) based, at least in part, on a first transport block size (TBS) table, wherein: the first TBS table has a reduced maximum TBS value relative to a second TBS table, the BS communicates with a second type of UE based, at least in part, on the second TBS table, the first type of UE supports a reduced peak data rate relative to the second type of UE, and the first TBS table shares a common set of TBS values with the second TBS table;
receiving information from the BS for use in determining a TBS value based, at least in part, on the first TBS table;
determining the TBS value based, at least in part, on the first TBS table using the received information; and
communicating with the BS through one or more communications having a payload with a number of bits determined based on the determined TBS value.

16. The method of claim 15, wherein the first TBS table and second TBS table are each a subset of a larger TBS table.

17. The method of claim 15, wherein the received information comprises an explicit index to the first TBS table.

18. The method of claim 17, wherein:
the explicit index is based on a mapping into the first TBS table; and
different mappings are used for different operating modes of the UE.

19. The method of claim 18, wherein the different operating modes of the UE comprise receiving downlink transmissions or transmitting uplink transmissions.

20. The method of claim 18, wherein the different operating modes of the UE comprise receiving unicast transmissions or receiving broadcast transmissions.

21. The method of claim 15, wherein the TBS value from the first TBS table is determined, at least in part, based on a transmission time interval (TTI) bundling size indicating a number of TTIs over which a payload is transmitted.

22. The method of claim 15, wherein the received information comprises a modulation and coding scheme (MCS) index.

23. The method of claim 15, wherein the first TBS table has a limited number of entries relative to the second TBS table.

24. The method of claim 23, wherein an index into the first TBS table comprises at least one less bit than an index into the second TBS table.

25. The method of claim 15, wherein the TBS value from the first TBS table is determined further based, at least in part, on resource assignment information.

26. The method of claim 15, wherein values in the first TBS table do not monotonically increase across all entries.

27. The method of claim 15, wherein the first TBS table is used to determine TBS values for at least one of:
   both downlink and uplink transmissions;
   both unicast and broadcast transmissions; or
   Multimedia Broadcast Multicast Service (MBMS) transmissions.

28. The method of claim 15, wherein the one or more communications comprise one or more uplink or downlink communications.

29. An apparatus for wireless communications by a base station (BS), comprising:
   at least one processor: and
   memory coupled to the at least one processor, the memory comprising code executable by the at least one processor to cause the BS to:
      communicate with a first type of user equipment (UE) based, at least in part, on a first transport block size (TBS) table;
      communicate with a second type of UE based, at least in part, on a second TBS table, wherein the first type of UE supports a reduced peak data rate relative to the second type of UE, and wherein the first TBS table shares a common set of TBS values with the second TBS table;
      send information to the first type of UE for use in determining a TBS value based, at least in part, on the first TBS table; and
      communicate with the first type of UE through one or more communications having a payload with a number of bits determined based on the determined TBS value.

30. The apparatus of claim 29, wherein the first TBS table and second TBS table are each a subset of a larger TBS table.

31. The apparatus of claim 29, wherein the sent information comprises an explicit index to the first TBS table.

32. The apparatus of claim 31, wherein:
   the explicit index is based on a mapping into the first TBS table; and
   different mappings are used for different operating modes of the first type of UE.

33. The apparatus of claim 32, wherein the different operating modes of the first type of UE comprise receiving downlink transmissions or transmitting uplink transmissions.

34. The apparatus of claim 32, wherein the different operating modes of the first type of UE comprise receiving unicast transmissions or receiving broadcast transmissions.

35. The apparatus of claim 29, wherein the TBS value based on the first TBS table is determined based, at least in part, on a transmission time interval (TTI) bundling size indicating a number of TTIs over which a payload is transmitted.

36. The apparatus of claim 29, wherein the sent information comprises a modulation and coding scheme (MCS) index.

37. The apparatus of claim 29, wherein the first TBS table has a limited number of entries relative to the second TBS table.

38. The apparatus of claim 37, wherein an index into the first TBS table comprises at least one less bit than an index into the second TBS table.

39. The apparatus of claim 29, wherein the TBS value based on the first TBS table is determined further based, at least in part, on resource assignment information.

40. The apparatus of claim 29, wherein values in the first TBS table do not monotonically increase across all entries.

41. The apparatus of claim 29, TBS values are determined based, at least in part, on the first TBS table for at least one of:
   both downlink and uplink transmissions;
   both unicast and broadcast transmissions; or
   Multimedia Broadcast Multicast Service (MBMS) transmissions.

42. The apparatus of claim 29, wherein the one or more communications comprise one or more uplink or downlink communications.

43. An apparatus for wireless communications by a user equipment (UE) of a first type, comprising:
   at least one processor; and
   memory coupled to the at least one processor, the memory comprising code executable to the at least one processor to cause the UE to:
      communicate with a base station (BS) based, at least in part, on a first transport block size (TBS) table, wherein: the first TBS table has a reduced maximum TBS value relative to a second TBS table, the BS communicates with a second type of UE based, at least in part, on the second TBS table, the first type of UE supports a reduced peak data rate relative to the second type of UE, and the first TBS table shares a common set of TBS values with the second TBS table;
      receive information from the BS for use in determining a TBS value based, at least in part, on the first TBS table;
      determine the TBS value based, at least in part, on the first TBS table using the received information; and
      communicate with the BS through one or more communications having a payload with a number of bits determined based on the determined TBS value.

44. The apparatus of claim 43, wherein the first TBS table and second TBS table are each a subset of a larger TBS table.

45. The apparatus of claim 43, wherein the received information comprises an explicit index to the first TBS table.

46. The apparatus of claim 45, wherein:
   the explicit index is based on a mapping into the first TBS table; and
   different mappings are used for different operating modes of the UE.

47. The apparatus of claim 46, wherein the different operating modes of the UE comprise receiving downlink transmissions or transmitting uplink transmissions.

48. The apparatus of claim 46, wherein the different operating modes of the UE comprise receiving unicast transmissions or receiving broadcast transmissions.

49. The apparatus of claim 43, wherein the TBS based on the first TBS table is determined based, at least in part, on a transmission time interval (TTI) bundling size indicating a number of TTIs over which a payload is transmitted.

50. The apparatus of claim 43, wherein the received information comprises a modulation and coding scheme (MCS) index.

51. The apparatus of claim 43, wherein the first TBS table has a limited number of entries relative to the second TBS table.

52. The apparatus of claim 51, wherein an index into the first TBS table comprises at least one less bit than an index into the second TBS table.

53. The apparatus of claim 43, wherein the TBS value based on the first TBS table is determined further based, at least in part, on resource assignment information.

54. The apparatus of claim 43, wherein values in the first TBS table do not monotonically increase across all entries.

55. The apparatus of claim 43, wherein TBS values are determined based, at least in part, on the first TBS table for at least one of:
- both downlink and uplink transmissions;
- both unicast and broadcast transmissions; or
- Multimedia Broadcast Multicast Service (MBMS) transmissions.

56. The apparatus of claim 43, wherein the one or more communications comprise one or more uplink or downlink communications.

57. An apparatus for wireless communications by a base station (BS), comprising:
- means for communicating with a first type of user equipment (UE) based, at least in part, on a first transport block size (TBS) table;
- means for communicating with a second type of UE based, at least in part, on a second TBS table, wherein the first type of UE supports a reduced peak data rate relative to the second type of UE, and wherein the first TBS table shares a common set of TBS values with the second TBS table;
- means for sending information to the first type of UE for use in determining a TBS value based, at least in part, on the first TBS table; and
- means for communicating with the first type of UE through one or more communications having a payload with a number of bits determined based on the determined TBS value.

58. An apparatus for wireless communications by a user equipment (UE) of a first type, comprising:
- means for communicating with a base station (BS) based, at least in part, on a first transport block size (TBS) table, wherein: the first TBS table has a reduced maximum TBS value relative to a second TBS table, the BS communicates with a second type of UE based, at least in part, on the second TBS table, the first type of UE supports a reduced peak data rate relative to the second type of UE, and the first TBS table shares a common set of TBS values with the second TBS table;
- means for receiving information from the BS for use in determining a TBS value based, at least in part, on the first TBS table;
- means for determining the TBS value based, at least in part, on the first TBS table using the received information; and
- means for communicating with the BS through one or more communications having a payload with a number of bits determined based on the determined TBS value.

59. A non-transitory computer-readable medium for wireless communications by a base station (BS), the computer-readable medium comprising code executed by at least one processor to cause the BS to:
- communicate with a first type of user equipment (UE) based, at least in part, on a first transport block size (TBS) table;
- communicate with a second type of UE based, at least in part, on a second TBS table, wherein the first type of UE supports a reduced peak data rate relative to the second type of UE, and wherein the first TBS table shares a common set of TBS values with the second TBS table;
- send information to the first type of UE for use in determining a TBS value based, at least in part, on the first TBS table; and
- communicate with the first type of UE through one or more communications having a payload with a number of bits determined based on the determined TBS value.

60. A non-transitory computer-readable medium for wireless communications by a user equipment (UE) of a first type, the computer-readable medium comprising code executable by at least one processor to cause the UE to:
- communicate with a base station (BS) based, at least in part, on a first transport block size (TBS) table, wherein: the first TBS table has a reduced maximum TBS value relative to a second TBS table, the BS communicates with a second type of UE based, at least in part, on the second TBS table, the first type of UE supports a reduced peak data rate relative to the second type of UE, and the first TBS table shares a common set of TBS values with the second TBS table;
- receive information from the BS for use in determining a TBS value based, at least in part, on the first TBS table;
- determine the TBS value based, at least in part, on the first TBS table using the received information; and
- communicate with the BS through one or more communications having a payload with a number of bits determined based on the determined TBS value.

* * * * *